Feb. 12, 1935.  L. M. DIETERICH  1,990,529
METHOD AND APPARATUS FOR COLOR PHOTOGRAPHY AND PROJECTION
Filed June 28, 1929   2 Sheets-Sheet 1
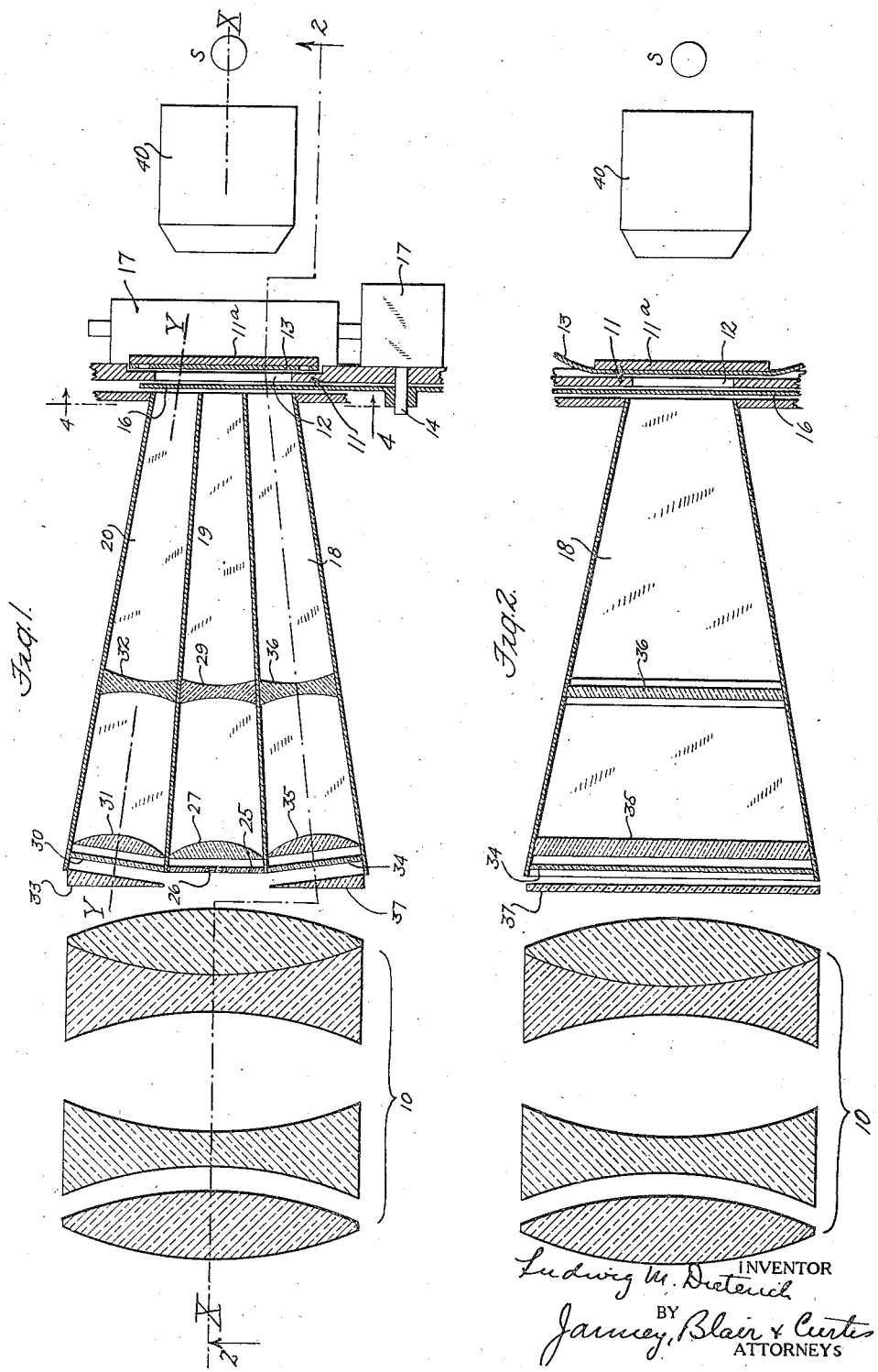
INVENTOR
Ludwig M. Dieterich
BY
Janney, Blair & Curtis
ATTORNEYS Feb. 12, 1935.  L. M. DIETERICH  1,990,529
METHOD AND APPARATUS FOR COLOR PHOTOGRAPHY AND PROJECTION
Filed June 28, 1929  2 Sheets-Sheet 2

Ludwig M. Dieterich
INVENTOR

BY Janney, Blair + Curtis
ATTORNEY

Patented Feb. 12, 1935

1,990,529

UNITED STATES PATENT OFFICE 1,990,529

METHOD AND APPARATUS FOR COLOR PHOTOGRAPHY AND PROJECTION

Ludwig M. Dieterich, Newark, N. J.

Application June 28, 1929, Serial No. 374,387

8 Claims. (Cl. 88—16.4)

This invention relates to photography and more particularly to the production of color photography.

One of the objects of this invention is to provide a thoroughly practical, simple and inexpensive method and apparatus for photographically reproducing, in natural colors, an object or scene. Another object is to provide a method and apparatus for cinematographically reproducing, on a screen, moving objects or the like, in their natural colors, all without unduly complicating the necessary apparatus, without prohibitively increasing the cost and without requiring unusual skill on the part of the operatives. Another object is to provide a simple and inexpensive apparatus which may be utilized both for photographically recording an object or scene in color-characteristics and for projecting in colors on a screen, for example, the resultant color-characteristic record.

Another object is to provide a photographic color record of an object or scene in which the record will have distinct and separate recording for each of a suitable number of the primary colors, to provide an apparatus for rapidly and inexpensively producing such a color record, and to provide a dependable and practical apparatus for projecting such a color record but with the records of or for the separate primary colors superimposed and registered. Another object is to provide a photographic record of the above-mentioned character for motion picture projection purposes which will be of standard size. Another object is to provide a motion picture film in which the color records for the various primary colors are included within the space of the usual frame of the film. Another object is to provide a thoroughly practical apparatus and method for producing such a motion picture film and to provide an apparatus for projecting and translating the color records of such a motion picture film.

Another object is to provide a method and apparatus for color photography that will be well adapted to meet the varying conditions of practical use. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawings in which certain mechanical features of my invention are diagrammatically illustrated.

Figure 1 is a plan view partly in section of my apparatus for achieving color projection;

Figure 2 is a vertical sectional view as seen along the line 2—2 of Figure 1;

Similar reference characters refer to similar parts throughout the several views in the drawings.

Figure 3:
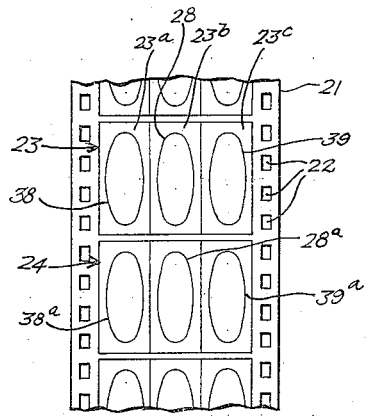
Figure 3 is a plan view of a portion of a motion picture negative or positive showing diagrammatically certain features of my invention.

Referring now to the drawings, and more particularly to Figures 1 and 2, there are shown certain mechanical features of my invention capable of being used in such steps of my process as produce a color record on a film, plate, or the like, and in such steps of my process as achieve the projection, as on a screen, of the color record or records. There is diagrammatically shown at 10 a lens system which may be of any suitable construction for photographic purposes and hence the system may consist of a single lens or of any suitable group of lenses. More particularly, and preferably, the lens system 10 is of the type and construction now used in photographically recording objects in motion, as in motion picture photography, and there is suitably related to the lens system a film gate 11 having an aperture 12 therein through which is exposed, to the rays of light emanating from the object or scene to be photographed and passing through the lens system 10, a sensitized photographic element 13 preferably in the form of a strip of film. The strip of film, preferably, also, is of standard width now widely used in motion picture work.

A shaft 14, set in rotation by any suitable means, as by a hand crank (not illustrated), is suitably related to the apparatus and from this shaft, by any suitable mechanism, the details of which per se do not form any part of this invention, there is operated a shutter 16 and mechanism, diagrammatically indicated at 17, for intermittently advancing the film step by step. The film-advancing mechanism and the shutter operate in synchronism so that the shutter 16 shuts off the light rays to or from the film 13 while the latter is being advanced throughout a distance equivalent to the length of a frame.

The lens system 10 may be adjusted in any suitable manner to focus the object or scene to be photographed with respect to the plane with which the film 13 coincides, and any suitable arrangement for focusing the apparatus may be employed. The focusing arrangement is preferably like that now employed in standard motion picture cameras and need not, therefore be illustrated.

Figure 4:
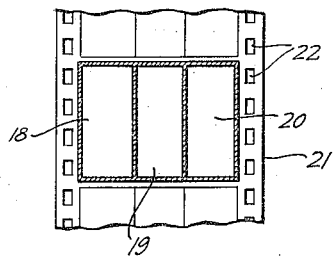
Figure 4 is a fragmentary view, as seen along the line 4—4 of Figure 1.

The path traversed by light rays emerging from the lens system 10 to the image plane or plane of the sensitized camera element 13 is sub-divided into a plurality of passages, illustratively shown in the drawings as three in number, though as will be made clear hereinafter, any other suitable number of such passages and related devices may be used, if desired. These passages are indicated at 18, 19, 20 and are made of any suitable opaque material in order thus to provide independent and non-interfering paths for light rays. The right-hand ends of the passages 18, 19 and 20, as viewed in Figure 1, terminates closely adjacent to the film gate 11 and hence terminate closely adjacent the film 13, the members or material of which these passages are formed being shaped, at the extreme right-hand ends thereof, to terminate in rectangular openings, as is clearly shown in Figure 4. The height of these openings is preferably equivalent to the height (or dimension lengthwise of the motion picture film) of a single frame thereon, while the width of the end openings, as viewed in Figure 4, is such that the three or more openings are just accommodated within the width of a single frame of the motion picture film.

The shutter 16 is, as is clear from Figures 1 and 2, interposed between the film and the open right-hand ends of the passages 18, 19 and 20; the shutter 16 is preferably of sheet metal and, in thus occupying but very little space, the right-hand end portions of the passages 18, 19 and 20 are made to terminate sufficiently close to the sensitized camera element, such as the film 13, as to prevent effectively any harmful interference of light rays passing in a direction toward the right along any one passage with any portion of the film other than that section presented to the right-hand opening of the passage.

A film pressure plate 11ª, removably secured in any suitable manner to the film gate 11, backs up the film 13 on that side of the latter remote from the shutter 16; this pressure plate 11ª may be of any suitable or usual construction and is preferably opaque.

In Figure 3 is shown a portion of a motion picture film 21, provided with the usual openings 22 extending along the edges and with which openings the film-handling mechanism and mechanism for intermittently moving the film, diagrammatically indicated at 17, engages. The film 21 is preferably of a standard size of motion picture film and in Figure 3 there are illustrated two frames 23 and 24 as illustrative of the frames, each corresponding to a single exposure, that extend along the strip film 21.

The frames of a standard motion picture film are substantially three-quarters of an inch in height, while the dimension thereof crosswise of the film is substantially one inch. The right-hand ends of the passages 18, 19 and 20 together, as viewed in Figure 4, encompass the area of a single frame; hence, the end opening of each passage is three-quarters of an inch in height, as viewed in Figure 4, (and as seen also in Figure 2) and, where three independent light passages are employed, the width of the opening of each passage is substantially one-third of an inch. These dimensions are, of course, only illustrative and may be varied as desired, but they are set forth herein in order to make clearer certain features of my invention as well as to illustrate how, in accordance with certain features of my invention, I may operate upon standard and readily available or commercial motion picture film.

In Figure 3 the frame 23 is shown as divided into sections 23ª, 23ᵇ and 23ᶜ corresponding in number to the number of light passages, illustratively three in number, resulting from exposure, in a manner more clearly described hereinafter, of the film through the light passages 18, 19 and 20. Each section of the frame 23 is, where the film is a standard motion picture film, substantially three-quarters of an inch in height and substantially one-third of an inch in width.

The opaque members or material forming the passages 18, 19 and 20 are preferably shaped, both in horizontal section, as viewed in Figure 1, and in vertical section, as viewed in Figure 2, that the left-hand end openings of these passages, arranged side by side, are preferably confined in over-all dimensions so as together to fall within the range or compass of the lens system 10. Where an odd number of passages is provided, such as the three passages 18, 19 and 20, the central passage, in this instance the passage 19, preferably has its axis coincident with the axis of the lens system 10. The axis of the lens system is indicated at X—X. The axes of adjacent passages, such as the axes of the passages 18 and 20, make, as is clear from Figure 1, an appropriate angle to the axis X—X of the lens system 10. For convenience, the axis of the passage 20 is shown at Y—Y. This angular relation between certain of the axes will be later referred to herein.

It will thus be noted that I cause light rays, emanating from the scene or object to be photographed and passing through the lens system 10, to be passed through these several independent passages 18, 19 and 20.

At the left-hand or entry ends of these passages, light rays will be available for producing as many images of the same object or scene as there are entry ends to the respective passages, each portion of the lens system 10 that is in front of a passage acting as though it were a separate lens system of itself; I am thus enabled to use a single lens system for the production of a number of different images of the same scene or object though it is to be understood, of course, that, in so far as other features of my invention are concerned, I may use as many separate lens systems as there are separate passages.

Considering now the central passage 19 which, as above noted, has its axis coincident with the axis X—X of lens 10, I position at the left-hand end thereof a color filter 25; this color filter 25 preferably closes the entry end of the passage 19. To the right of the color filter 25 I position a cylindrical lens 27, the cylindrical lens 27 being so shaped and proportioned that it reduces, in one dimension only, the image formed of the object or scene by the rays emanating therefrom.

Interposed between the cylindrical lens 27 and the film 13 and within the passage 19 is a lens 29, the function and characteristics of which are such that the displacement of the focus of the lens system 10, due to the interposing of the cylindrical lens 27 in the path of the light rays, is corrected and hence so that the image, reduced in one dimension, namely, its width, is clearly produced on the film 13.

The two lenses 27 and 29 are thus made to co-act to achieve a reduction in one dimension of the image produced upon the film without interfering with the focusing of the lens system 10. More specifically, the lenses 27 and 29 insure that the lens system 10, in so far as concerns the maintenance of coincidence between the image plane of the lens system 10 and the film plane as the focus of the lens system 10 is changed for different distances of the object from the camera, functions as though these two lenses were not present, while these two lenses make certain that one dimension of the image is reduced with respect to the other dimension of the image.

By way of specific example, and again assuming that three separate light passages are employed, the reduction in width of the image produced upon the film 13 is one-third, while the height of the image is unaffected. If, for example, four separate light passages were to be employed, this reduction in width would be one-fourth.

Referring briefly to Figure 3, the section $23^b$ of the frame 23 may be considered as illustrative of the frame produced by the light effect through the passage 19 of Figure 1, and in Figure 3 I have indicated an image 28 on section $23^b$ of the frame 23. The image 28 is shown substantially as an ellipse in which the minor axis is one-third of the major or vertical axis to illustrate the effect of the lens action above-described in producing an image of an object which is a circle whose diameter corresponds to the major or vertical axis of the image 28.

The action of the color filter 25 and the aperture 26 therein will be more clearly described hereinafter.

Considering now an adjacent passage, such as the passage 20, the axis Y—Y of which is at an angle to the axis X—X of the lens system 10, and referring still to Figure 1, there is positioned adjacent the left-hand end of the passage 20 a color filter 30, a cylindrical lens 31 functioning similarly as the cylindrical lens 27 above described, and a focal length-correcting lens 32 functioning similarly as the lens 29 above described. To the left of the color filter 30 I position a prism 33 acting to bend the light rays emanating from the lens system 10 throughout a sufficient angle to cause the pencil of rays passing down the passage 20 to have its axis coincident with the axis Y—Y of the passage 20.

The passage 18 is provided with a color filter 34, a cylindrical lens 35, a focus-correcting lens 36, and a prism 37, the arrangement and function and characteristics of which will be clear in view of the arrangement and correlation of similar parts above-described in connection with the passage 20. It might be noted that, just as the prism 33 bends the light rays so that the axis of the pencil is coincident with the axis of the passage 20, the prism 37 bends the light rays throughout an appropriate angle to cause the axis of the pencil to be coincident substantially with the axis of the passage 18.

Considering now in detail the color filters 34, 25 and 30 associated with the passages 18, 19 and 20, it is first to be noted that they are so selected as to color-filtering action that light, emanating from the scene or object to be photographed and passing through the lens system 10, is subdivided into such color components as will, when these components are combined, reproduce the colors of the scene or object being photographed. Where, as in the illustrative and preferred embodiment of my invention, I utilized three passages and obtain three separate images for each exposure of the film, I make one of the color filters, such as the filter 30, of red-orange, another color filter, such as the filter 25, of green-yellow, and the third, such as the filter 34, of blue-violet.

These filters may be of any suitable construction. For example, the filters may consist of colored gelatin suitably interposed or cemented between two sheets of plain glass.

As the film 13 is halted during the interval that the shutter 16 exposes a frame, such as frame 23 (Figure 3) of the film, I achieve three images, one on each of the sections $23^a$, $23^b$ and $23^c$ corresponding respectively to the passages 18, 19 and 20. For convenience, the object photographed may be assumed to be a white disk; due to the action of the cylindrical lenses 35, 27 and 31, the images appear, as already above explained, with their lateral dimension or width materially reduced. The single disk therefore appears in three substantially elliptical images 38, 28 and 39 on the sections $23^a$, $23^b$ and $23^c$, respectively.

The image 38 corresponding to the image produced by the pencil of rays passing through the passage 20 (Figure 1), however, is actinically impressed upon the section $23^a$ of the frame 23 of the film 13 by the rays that are passing through the color filter 30 and hence by rays that are red-orange. The image 28 on the section $23^b$ and corresponding to that produced by the light rays passing through the passage 19 is actinically impressed by the action of the rays passed by the filter 25; the filter 25 is green-yellow and passes only green-yellow rays. The image 28 on the section $23^b$ of the film 13 therefore corresponds to the image produced by the green-yellow light rays. The image 39 on the section $23^c$, corresponding to the light rays passing through the passage 18, is actinically impressed on the film by the blue-violet rays passed by the filter 34.

The images thus produced during this single exposure on the several sections of the single frame are succeeded, during the succeeding exposure permitted by the shutter 16 and after the film 13 has been moved in advance by the mechanism 17, by three images $38^a$, $28^a$ and $39^a$ on a succeeding frame 24, the process and steps above described being repeated in a manner that will now be clear.

The opaque members that make up the passages 18, 19, 20, etc., insure that there is no interference between the colored rays passed by the respective filters. Also, it should be noted that the lens system, the sensitized camera element, or film, or plate, or the like, and the interposed parts, such as the prisms, filters, lenses, and the like, are preferably enclosed in a suitable and preferably opaque cabinet, box, or like enclosure, but inasmuch as the details of such enclosure form no part of the present invention, the enclosure is not shown in the drawings nor need it be further described.

The object, assumed to be a white disk, permits the emanation therefrom of white light which, by the steps above described, is broken up into a number of components, illustratively three in number, and an image corresponding to each of the three components is produced upon the film. There are thus recorded on the film 13 the color characteristics of the white disk or object.

Figure 5:
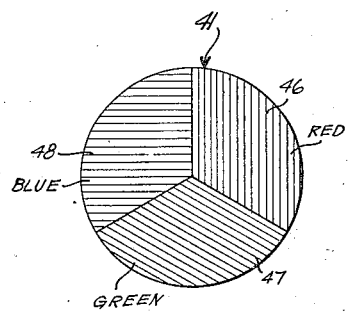
Figure 5 represents a circular or disk-like object, in three different colors, assumed to be an object to be photographed.

Let the object, however, be replaced by a disk 41, as shown in Figure 5, subdivided into three sectors 46, 47 and 48. Let it be assumed that the sector 46 is solid red, the sector 47 green, the sector 48 blue.

Let now the steps above described be repeated. The color filter 34, permitting the passage only of blue-violet rays, thus permits only the blue rays emanating from the sector 48 to strike the section 49ª of the frame 49 (see Figure 6) so that an image 48ª is produced on that section of the frame, the image 48ª being reduced in lateral dimension by one-third.

The filter 30 (Figure 1) permitting the passage therethrough only of the red-orange rays causes the red rays emanating from the sector 46, and none other, to strike the section 49ᶜ of the frame 49 of the film, thus producing an image 46ª corresponding to the sector 46 but reduced in its lateral or horizontal dimension by one-third.

The filter 25 of the sector passage 19 permits the passage therethrough of green-yellow rays and accordingly produces an image 47ª on the section 49ᵇ of the frame 49 corresponding to the sector 47, which is green. The image 47ª is one-third as wide as the sector 47.

Thus, it will be seen that there is produced on each section of a frame on the film an image of so much of an object or scene as is in or of the color passed by the filter acting upon the light rays affecting that particular section on the frame or film.

Figure 6:
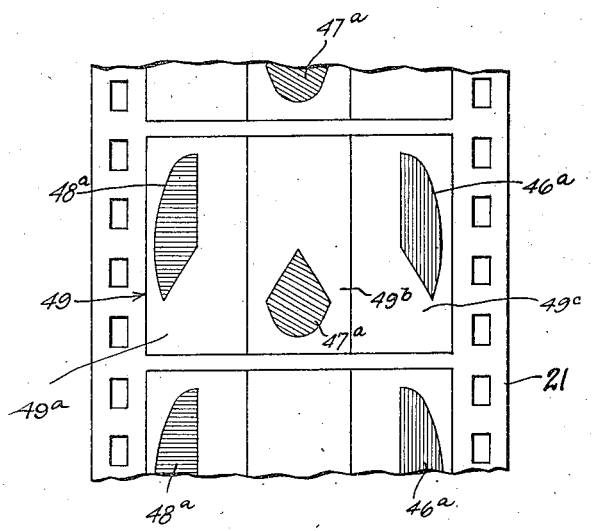
Figure 6 is a plan view on an enlarged scale of a portion of a motion picture film showing the color-characteristic record resulting from a single exposure of the film to the object in Figure 5.

The film or negative resulting from the steps above described is thereupon developed in the usual way and, it may be noted, is black and white. For example, the images on the sections 49ª, 49ᵇ and 49ᶜ of a frame 49 of the film shown, for example, in Figure 6, are not in colors, but are in "black and white" like any usual motion picture negative. From this negative I then print, in a manner usual in printing positive motion picture films from negative films, any desired number of positive films. The printed positive is likewise "black and white" like the ordinary motion picture positive film.

A positive film thus produced is then utilized for projecting on a screen and I use substantially similar apparatus as above described in connection with Figures 1, 2 and 4, and in considering the method and apparatus for projecting the images of the positive film on a screen reference may again be made to the above-mentioned figures of the drawings. The screen (not shown) may be considered as being at any suitable distance to the left of the lens system 10, as seen in Figures 1 and 2. The positive film is run through the apparatus in coaction with the shutter 16 and is intermittently advanced in synchronism with actuation of the shutter 16, by the mechanism 17. To the right, however, of the film as seen in Figures 1 and 2, I position any suitable source of light diagrammatically indicated at S and between the source S and the film 13 I place a suitable lens or lens system, preferably a condenser, diagrammatically indicated at 40. The removable pressure plate 11ª (Figure 1) is, of course, removed to permit the light rays from the source S to pass through the film and into the several passages, such as passages 18, 19 and 20.

The source of light S may, as above noted, be of any suitable form, such as an incandescent lamp of suitable power, an arc, or the like, and may be considered as emitting substantially white light. The white light from the source S is suitably concentrated by the condenser 40 on the positive film which, as is clear from the foregoing, as the frames thereon subdivided into sections, illustratively shown and described as three in number, in a direction crosswise of the strip of film. The positive film, being a print from the negative film, has, of course, all of the characteristics thereon that appear on the negative, and the positive is run through the apparatus so that the section, such as section 23ª of a frame, such as frame 23 of Figure 3, is presented, when the shutter 16 opens, to the right-hand end opening of the passage 18, section 23ᵇ of the same frame is at the same time presented to the right-hand end opening of the passage 19 and section 23ᶜ is presented at the same time to the right-hand end opening of the passage 20.

The image 39 on section 23ª is, as is now clear in view of all of the foregoing, an image corresponding to the light effects produced by passage of light rays from the object or scene being photographed through the color filter 34 (above assumed to be blue-violet) and produced by the cylindrical lens 35. The image 28 on section 23ᵇ and the image 39 on the section 23ᶜ of the same frame correspond respectively to images produced by the light effects of the filters 25 and 30, respectively, on light rays emanating from the object or scene being photographed. When, however, these images, on the positive film, are presented as above described to passages, such as the passages 18, 19 and 20, in which respectively the same or similar color filters and lenses are active as were in effect when these images were produced on the negative film, and when the light from the source S is thus passed through the positive, through the sections on the frame or frames thereof and thence through the respective passages 18, 19 and 20, the cylindrical and coacting lenses act to enlarge the previously condensed dimension or width of the images and do so in the same degree as these lenses or similar cylindrical lenses acted initially in condensing or diminishing this dimension of width; at the same time the color filters and prisms come into action.

The color filter 34 is blue-violet; it acts to filter out all of the color components of the white light passed through the section 23ª of the film so that light rays corresponding to the image 38 emerge from the filter 34 only in blue-violet color, are bent by the prism 37 and passed through the lens system 10 from which they emerge, in blue-violet color, on the screen.

A similar action takes place with respect to the color filter 30 and the prism 33 but the color filter 30 being red-orange causes the projection of light rays corresponding to the image 39 of the section 23ᶜ in red-orange color. The color filter 25 with the aperture 26 therein reacts similarly with respect to the image 28 of the middle section 23ᵇ of a frame on the film positive causing light rays of green-yellow to be passed through the lens system 10 and corresponding to the image 28.

The images thus cast on the screen are respectively complete and undistorted object images and they are, moreover, in optically perfect registration. However, one of these superimposed or registering images has the same red-orange color value as was registered on the negative when the object being photographed was exposed to the negative through the red-orange color filter. Another of these object images cast upon the screen has the same green-yellow color value as the object had when the latter was initially exposed to the film through the green-yellow color filter. The third object image has the same blue-violet color value as the object being photographed had when the latter was exposed to the film through the blue violet color filter.

Thus, the resultant or composite image on the screen as seen by the eye will be seen to have carried into it, separately, the same color components that went to make up the color of the object or scene being photographed or any part or parts thereof, and these color components, when thus optically combined through the lens system 10, or when thus superimposed upon the screen, make up a resultant color or colors having substantially identically the same color spectrum as the spectrum of the color or colors of the object or scene initially photographed.

These color components correspond to the color components in which the white light from the white disk, assumed hereinabove to be the first object to be photographed, was broken up and hence when combined, as immediately above described, in the process of projection, produces the same white light and hence the same color, on the screen, as was characteristic of the object itself when photographed.

Assume, however, that now the section of film shown in Figure 6 is put through the steps of projection. A beam of white light corresponding in shape to the image 48ᵃ passes in a direction toward the left through the passage 18 (see Figure 1) and emanates from the lens system 10 in a color that is blue (due to the action of the color filter 34 which blocks out all of the component color excepting the blue-violet) and which is enlarged in lateral dimension three times, due to the action of the lenses 35—36; thus, there is thrown upon the screen a sector that is blue in color and perfectly symmetrical to the section 48 of the object 41 (Figure 5) initially photographed. Of course, it will be understood that in the process of projecting the projected image may be magnified or enlarged to as great an extent as may be desired.

By an analogous action, there is projected upon the screen a pencil of red rays whose cross-section is symmetrical to the sector 46 of the object 41, all other color components from the white light from the source S that passed through the section 49ᶜ of the frame 49 (Figure 6) excepting the red rays, being blocked out by the action of the color filter 30. The lenses 31 and 32 now act to enlarge the lateral dimension three times so that a red sector is projected on the screen, simultaneously with the projection of the adjacent blue sector corresponding to the sector 48 and alongside of the sector produced by the blue rays emanating from the passage 18.

At the same time, during this single stoppage of the film when the frame 49 is presented to the passages 18, 19 and 20, there is projected on the screen a pencil of green rays symmetrical in cross-section with the sector 47 of the object 41 initially photographed. The pencil of white light passing through the image 47ᵃ (Figure 6) and into the passage 19 (Figure 1) is enlarged three times in lateral dimension, due to the action of lenses 27—29, while all color components thereof excepting the green rays are blocked out by the green-yellow color filter 25.

Thus, I am enabled to achieve the projection on a screen of color effects identical to the color effects produced upon the eye in the object as the object was photographed, and in the immediately above-assumed example the simultaneous and distinct projection of an object in three colors (blue, red, green) has been made clear. In view of all of the foregoing it need now be merely pointed out that, where a color has to be reproduced that is made up of two or more colors, two or more complete images of that portion of the object having that particular color are achieved on the film each image corresponding to a different component of the color in question.

The practice of my process in this respect is believed to be clear in view of the hereinabove first assumed example of projecting in its true color a white object by projecting individually all of the component colors that go to make up the white.

I achieve best results where the spectrum of the light source S, utilized in projecting, is identical with or closely corresponds to the spectrum of the light that illuminated the object or scene when the latter was initially photographed.

Thus, I am enabled to faithfully reproduce in projection all of the colors that initially appear in the object or scene photographed. By means of three filters as above described, I am enabled to achieve excellent results since the selection of the color filters is sufficient to bring about the impressing, on different sections of the film, of different images of the same object but each image corresponding to different color components which, when correlated or combined, with substantial faithfulness reproduce the initial color of the object or scene. It is to be understood, however, that I may use a different number of color filters and, in fact, I may use as many color filters as there are primary colors, producing for each primary color a separate image on a separate section of the film.

It will thus be seen that there has been provided in this invention a method and apparatus in which the several objects hereinabove described, as well as many thoroughly practical advantages, are successfully achieved. It will be seen that the invention is of a thoroughly practical nature and that the method and apparatus are well adapted to meet the conditions of practical use.

As many possible embodiments may be made of the mechanical features of the above invention and as the art herein described might be varied in various parts all without departing from the scope of the invention, it is to be understood that all matter hereinabove set forth or shown in the accompanying drawings, is to be interpreted as illustrative and not in a limiting sense.

I claim:

1. The method of color photography which consists in intermittently moving a film in strip form, impressing upon a section of the film, during the period of stoppage thereof, a plurality of images of a scene or subject arranged side by side in a direction transversely of the film, condensing the light rays forming each image to diminish the dimension of the image on the film in a direction transversely of the film, interposing color filters in the paths of the rays forming the plurality of images, the filter in any one path being different in action from the filter in another path, and forming an unfiltered image of the scene or subject in one of said paths to be impressed on the film.

2. The method of color photography which consists in interposing in the space between the lens system and the film of a motion picture camera a plurality of septum plates to divide the film section, during a stoppage of the film, into a plurality of image-receiving portions arranged transversely of the film, condensing the light rays that strike each aforesaid portion of the film section so as to condense the image formed thereon in the dimension extending transversely of the film, filtering out a different component color from the light rays directed toward each of certain of the aforesaid sections of the film, and causing unfiltered light rays from the scene or subject to pass onto, and thereby impress an unfiltered image of the scene or subject on, another of said sections of the film.

3. In apparatus of the character described, in combination, a lens system, means for intermittently moving a film in strip form along the image plane of said lens system, a removable film pressure plate for backing up the film, opaque means interposed between said lens system and the film for dividing the intervening space into a plurality of passages arranged side by side in a direction transverse of the film, color filters for certain of said passages, the color filter of one passage being of different action from the color filter of another passage, and means whereby unfiltered light from the scene or subject corresponding to an unfiltered image of the scene or subject passes through another of said passages, and lens means in each passage for focusing the rays passing through said passages upon a film.

4. In apparatus of the character described, in combination, a lens system, means for intermittently moving a film in strip form along the image plane of said lens system, opaque means interposed between said lens system and the film for dividing the intervening space into a plurality of passages arranged side by side in a direction transverse of the film, color filters for said passages, the color filter of one passage being of different action from the color filter of another passage, and lens means in each passage for so condensing the light rays in each passage as to reduce, in a direction transversely of the film, the dimension of the images formed on the film, one of said filters having means free from color-filtering action and adapted thereby to pass unfiltered light therethrough and to impress on the film an unfiltered image of the scene or subject.

5. In apparatus of the character described, in combination, a lens system, means for intermittently moving a film in strip form along the image plane of said lens system, opaque means interposed between said lens system and the film for dividing the intervening space into a plurality of passages arranged side by side in the direction of the plane of the film, color filters for certain of said passages, the color filter of one passage being of different action from the color filter of another passage and means whereby unfiltered light from and hence an unfiltered image of the scene or subject passes through another of said plurality of passages, and means in such passages whose axis is not coincident with the axis of said lens system for bending the light rays transmitted to said passages by said lens system onto the portions of the film corresponding respectively to said passages.

6. In apparatus of the character described, in combination, means for holding a sensitized camera element, lens means for impressing thereon and on different portions thereof images of the same scene or object, and a color filter interposed in the path of the rays forming each image, each color filter being of different color filtering action and shutter means whereby said different portions of said camera element are simultaneously exposed through said lens means and said color filters to light emanating from said scene or object, one of said color filters being constructed to permit also the passage of unfiltered light from the scene or object onto the camera element and to thereby cause the impression on said camera element of an unfiltered image of the scene or object.

7. The method of color photography which consists in simultaneously impressing upon different portions of a sensitized camera element images of the same scene or object, filtering out a different color component or components from the light rays directed toward the various portions of the sensitized camera element, and causing unfiltered light rays from the scene or object to pass onto one of said portions and thereby impress upon the latter an unfiltered image of the scene or object.

8. In apparatus of the character described, in combination, means for holding a sensitized camera element, lens means for impressing thereon and on different portions thereof images of the same scene or object, and color-filtering means interposed in the path of the rays forming certain of said images, each color-filtering means being of a different color-filtering action, and one of said color-filtering means having an aperture therein to permit the passage therethrough of unfiltered light from the scene or object and to thereby impress on a portion of the sensitized camera element an unfiltered image thereof.

LUDWIG M. DIETERICH.